United States Patent [19]

Harrison

[11] 4,208,720
[45] Jun. 17, 1980

[54] CALCULATOR WITH ALGEBRAIC OPERATING SYSTEM

[75] Inventor: Herman W. Harrison, Dallas, Tex.

[73] Assignee: Texas Instruments Incorporated, Dallas, Tex.

[21] Appl. No.: 708,958

[22] Filed: Jul. 26, 1976

[51] Int. Cl.² ........................ G06F 7/38; G06F 15/02
[52] U.S. Cl. .................................................. 364/709
[58] Field of Search ................. 233/156, 152; 364/709

[56] References Cited

U.S. PATENT DOCUMENTS

| 3,720,820 | 3/1973 | Cochran | 235/156 |
| 3,971,924 | 7/1976 | Ozawa et al. | 235/156 |
| 3,995,148 | 11/1976 | Ozawa et al. | 235/156 |

Primary Examiner—Jerry Smith

Attorney, Agent, or Firm—Melvin Sharp; Stephen S. Sadacca

[57] ABSTRACT

Disclosed is an electronic calculator having a data entry unit for inputting numeric data, expressions such as parentheses and hierarchal mathematical commands, an arithmetic unit for performing arithmetic operations on the numeric data, a memory for storing the numeric data and associated hierarchal mathematical commands inputted via the data entry unit and logic circuitry for enabling the arithmetic unit to perform arithmetic operations on numeric data inputted via the data entry unit within a pair of parentheses, the logic circuitry enabling the arithmetic unit to perform a higher order hierarchal mathematical command before a lower order hierarchal command eventhough the higher order command is received after the lower order hierarchal mathematical command.

10 Claims, 2 Drawing Figures

CALCULATOR WITH ALGEBRAIC OPERATING SYSTEM

BACKGROUND OF THE INVENTION

The present invention relates to data entry system for an electronic calculator and more particularly to an algebraic operating system capable of responding to parentheses in an algebraic expression. When referring to a hierarchal mathematical command, I intend to refer to an inputted mathematic function which requires two operators, such as the functions: add, subtract, multiply, divide $Y^x$, $x\sqrt{Y}$ and the like. Non-hierarchal mathematical commands then refer to an inputted mathematic function which requires only one operator, such as: log x, ln x, X!, sine X, cosine X, tangent X and the like.

The data entry systems which have been used on electronic calculators known in the prior art may be separated into three classes. The first class corresponds to hierarchal data entry systems which are discussed hereafter. The second and third classes correspond to non-hierarchal data entry systems; the second class being algebraic, non-hierarchal calculators and the third class being non-algebraic, non-hierarchal calculators. The difference between these classes of calculators is best pointed out by example. Calculators of the third class utilize, for instance, data entry systems known as "reverse polish notation" in which both operators in an hierarchal expression must be entered before the hierarchal mathematical command is inputted into the electronic calculator. Thus, to multiply $3 \times 6$, first the three is keyed in, then the six is keyed in and finally the multiply command (X) is keyed in. Since the order in which the data and hierarchal mathematical commands are keyed in differs from the corresponding algebraic expression .. $3 \times 6$ .. this third class is referred to as non-hierarchal, non-algebraic data entry systems. Data entry systems of the second class are algebraic in nature but are similarly non-hierarchal. That is, the mathematic commands are performed in the order received, thus if $2 + 3 \times 6$ were keyed into an electronic calculator of the second class then the two would first be added to the three and the sum (five) would be multiplied by the six to obtain thirty. However, since the normal hierarchy associated with mathematic expressions requires the multiplication to be performed prior to the addition, the expression $2 + 3 \times 6$ should equal twenty and not thirty.

Electronic calculators of the first class are those calculators which generally follow the rules of algebraic hierarchy. Thus, in the aforementioned example, such an electronic calculator would not perform the $2 + 3$ addition when the three is followed by a multiplication command, but would carry out the indicated multiplication before the addition.

Electronic calculators having a hierarchal algebraic data entry system are known in the prior art; however, these hierarchal algebraic data entry systems exhibit only minimal hierarchy. Exemplary of the electronic calculators exhibiting minimal algebraic hierarchy is the electronic calculator disclosed in U.S. Pat. No. 3,720,820 dated Mar. 13, 1973. This electronic calculator has three levels of hierarchy and therefore, can perform the expression $2 + 3 \times 5^3$ in correct algebraic hierarchy, in as much as the 5 would be cubed before it is multiplied times three and the cubing operations and multiplying operations would be accomplished before the indicated addition operation. However, the electronic calculator disclosed in U.S. Pat. No. 3,720,820 is incapable of receiving an algebraic expression such as $2 + 3 \times 5^{(2+1)}$, there being no provision parentheses keys with the calculator disclosed in U.S. Pat. No. 3,720,820.

It should be evident to a person acquainted with writing of algebraic expressions that the use of parentheses in algebraic expressions greatly expands the ability of one to write or express complicated algebraic formula.

It is therefore one object of this invention to equip an electronic calculator with an algebraic operating system capable of responding to parentheses in an algebraic expression according to the rules of algebraic hierarchy.

It is another object of this invention to increase the levels of complexity of algebraic expressions which a hand held or desk model calculator can accommodate.

The foregoing objects are achieved according to the present invention as now described. In a preferred embodiment invention, an algebraic operating system memory is interconnected with a modern electronic calculator system. The algebraic operating system memory is preferably implemented as a stack memory, and has provision for storing data words, pending arithmetic operator codes and a parentheses level count associated with each data word. The algebraic operating system memory is arranged to store the most recently received hierarchal mathematical command as a pending arithmetic operator and to execute any previously stored pending arithmetic operator having the same or higher hierarchy than the just received hierarchal mathematical command, so long as both pending arithmetic operators are at the same parentheses level count. If the previously stored pending arithmetic operator is of a lower hierarchy level than the just received pending arithmetic operator, or if the parentheses level count increments the previously stored pending arithmetic operator is not executed but is rather bumped in the memory stack when the most recently received arithmetic operator and associated data are inserted into the algebraic operating system memory stack. A left handed parentheses increments the parentheses level count while a right handed parentheses decrements the parentheses level count. A right handed parentheses also causes all pending arithmetic operators at that parentheses level count to be executed in the order that they are read out of the algebraic operating system memory stack. An equals sign causes all pending arithmetic operators to be executed in the order that they are read out of the algebraic operating system memory stack regardless of parentheses count level.

DETAILED DESCRIPTION OF SPECIFIC EMBODIMENT

Figure 1:
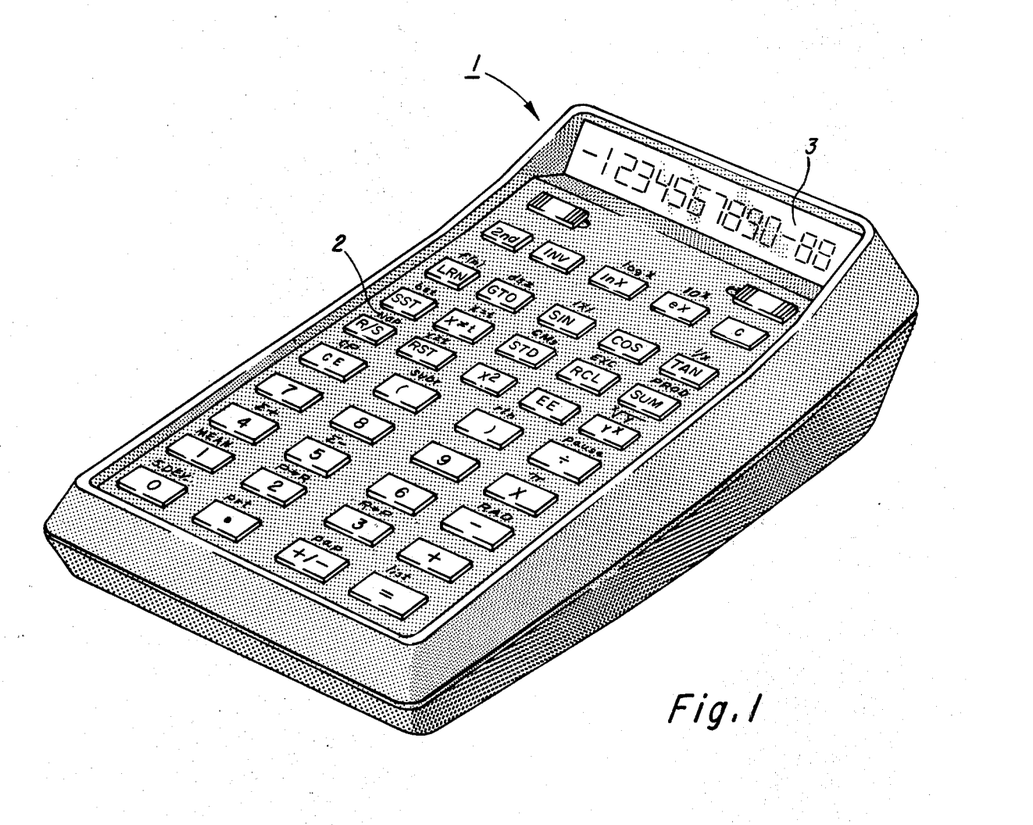
FIG. 1 depicts a hand-held calculator of the type which may employ the present invention.

Referring to FIG. 1 an electronic portable calculator of the type which may employ features of this invention is shown in pictorial form. The calculator 1 comprises a keyboard 2 and a display 3. The display 3, in one embodiment, consists of twelve digits or characters, each provided by an array of light emitting diodes, a liquid crystal display, gas discharge tube or other display means. The display is preferably implemented having 8 mantissa digits, 2 exponent digits, 2 character places (one for the mantissa and one for the exponent), thereby permitting outputting of the data in scientific notation, for instance. Ordinarily, the display would be of the seven segment or eight segment variety, with provision for indicating a decimal point for each digit. The display 2 includes a number of keys (0-9), a decimal point key, and the conventional plus (+), minus (−), mutiply (×), divide (÷), and equal (=) keys. Further the keyboard 2 includes keys for higher order hierarchal mathematical commands, such as exponentiation ($Y^x$ and $^x\sqrt{Y}$), left hand parentheses ... (... and right hand parentheses . . . ) . . . . The calculator may further be provided with non-hierarchal mathematical command keys such as, for example, $X^2$, X!, the reciprocal of X, lnX, log X, and so forth. These mathematic functions are referred to as being non-hierarchal inasmuch as only one operator must be entered into the calculator in order to perform the indicated operation, whereas for hierarchal expressions, two numbers must be entered into the calculator in order to accomplish the indicated mathematical function. Further, the calculator may be provided with keys for storing and recalling data from memory, for clearing the calculator (C) and for clearing the last entry (CE). When referring to parentheses, I also mean to refer to brackets or other similar algebraic expressions which accomplish the function of the parentheses in an algebraic equation.

Figure 2:
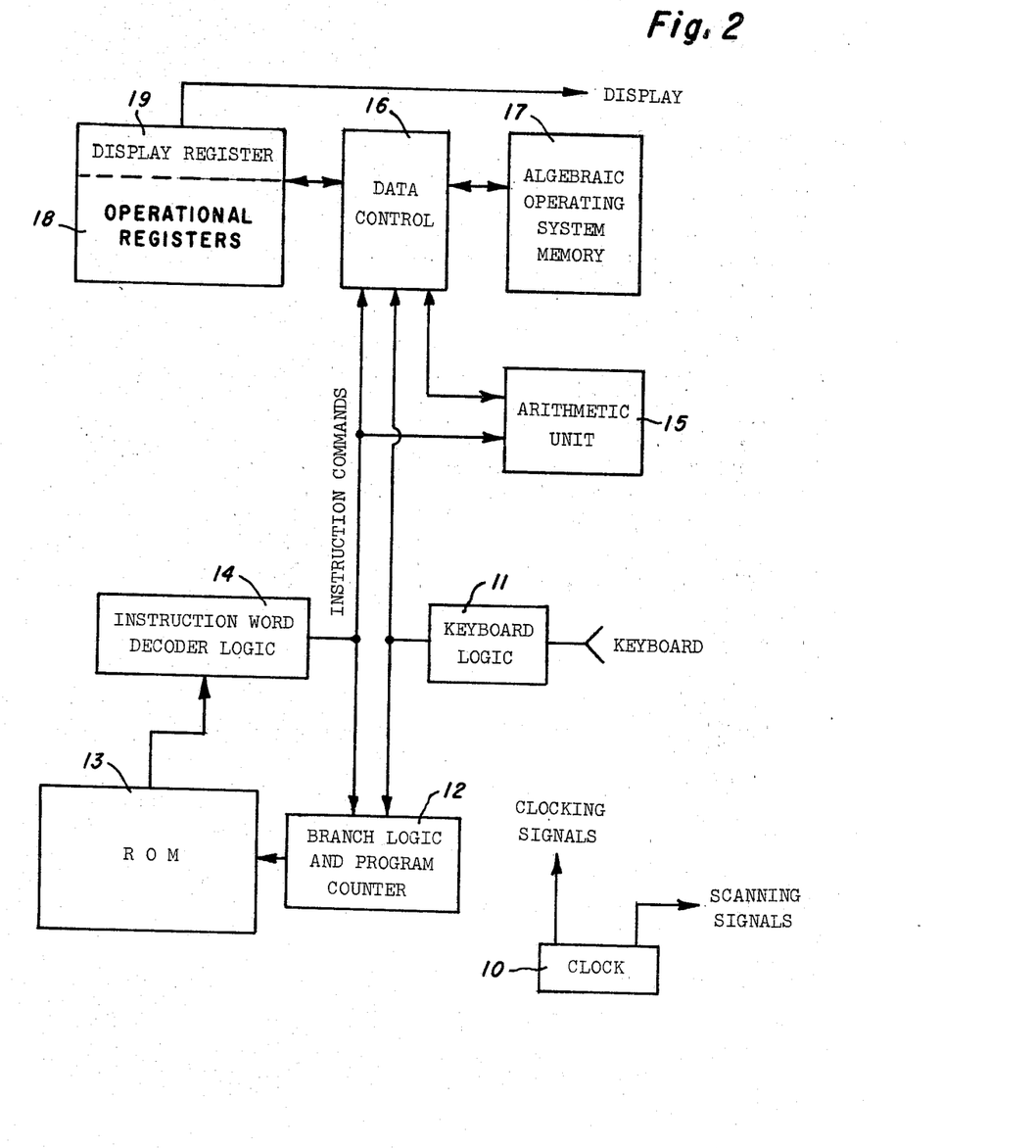
FIG. 2 is a block diagram of an electronic calculator system embodying the present invention.

Referring now to FIG. 2 there is shown in block diagram form of an electronic calculator embodying the present invention. It is to be understood that the block diagram of FIG. 2 is not intended to represent the block diagram of a detailed representation of an electronic calculator but rather is intended to merely indicate how the algebraic operating system of this invention is implemented in a very typical electronic calculator. Thus, the calculator of FIG. 2 is shown with a clock 10 which provides the clocking signals for transferring data throughout the electronic calculator and provides scanning signals for scanning the display 3 and keyboard 2 or other data entry means. The inputs from the keyboard are provided to keyboard logic 11 which provides an address in response to the depression of a particular key to branch logic and program counter 12.

It should be evident to one skilled in the art that keyboard logic 11, as well as other logic circuitry, may be separately implemented on the calculator as here indicated or it may be implemented as a part of read-only-memory 13 and instruction word decoder logic 14. The address received from keyboard logic 11 is inserted into the counter in branch logic and program counter 12 which address is utilized in addressing read-only-memory (ROM) 13. ROM 13 provides a set of instruction words in response to the depression of a key at keyboard 3, typically a different set of instruction words being associated with each key on keyboard 3. The instruction words read out of ROM 13 are decoded by instruction word decoder logic 14 to provide instruction commands to branch logic and program counter 12, arithmetic unit 15 and data control 16. The instruction commands provided to branch logic in program counter 12 enable branches to be executed by inserting a new address into the program counter in response to a branch instruction command. The instruction commands provided to data control 16 and arithmetic unit 15 control the manipulation of the numeric data in the calculator.

Data control 16 is interconnected with the algebraic operating system memory 17, with display register 19 and operational registers 18 and with arithmetic unit 15. The display register 19 holds the number then being displayed by the display 2 and has associated therewith a plurality of operational registers 18 which are used in conjunction with arithmetic unit 15 perform arithmetic operations in response to particular instruction commands. Data control 16 comprises a series of selector gates for interconnecting the appropriate operational registers 18, display register 19 and algebraic operating system memory 17 with the arithmetic unit 15 or with portions instruction words, if need be, in response to different instruction commands.

Numeric data is inputted into display register 19 from keyboard 2 either by a data path from keyboard logic 11 via data control 16 under control of appropriate instruction commands or by inputting selected portions of appropriate instruction words in response to selected instruction commands. The electronic calculator system hereinbefore described, with the exception of the algebraic operating system memory 17, basically corresponces to the type of electronic calculators known in the prior art. Exemplary of prior art calculator systems, is the calculator system disclosed in U.S. Pat. No. 3,922,538 issued to Cochran et al on Nov. 25, 1975 and assigned to the assignee of this invention.

Register 18 and display register 19 typically store data words of numeric data having at least as many digits as display 2 has character positions. The algebraic operating system memory 17 preferably stores a plurality of data words, each word preferably being of the same length as the data word stored in registers 18 and 19, and, in addition, algebraic operating system memory 17 preferably stores a pending arithmetic operator code associated with each stored data word and further a parentheses level count associated with each stored data word. The parentheses level count preferably starts at zero and advances one for each left handed parentheses encountered and decrements one for each right handed parentheses encountered. The pending arithmetic operator code is typically a 3 or 4 bit code representative of a hierarchal mathematical command. The algebraic operating system memory 17 is preferably a push-pop stack, that is, it operates in a first-in-last-out mode. The memory location from which data is retrieved or to which data is entered is hereinafter referred to the accessible memory location in algebraic operating system memory 17. It should be evident, moreover, that algebraic operating system memory 17 need not be a hardwired push-pop stack, but may also be implemented as a series of shift registers, as a sequentially addressed memory (S.A.M.), as a random access memory (RAM) or other means which is manipulated by the electronic calculator to function in much the same manner as a push-pop stack. In the practice of this invention, only the accessible memory location (for a data word, its pending arithmetic operator code and its parentheses level count) is preferably accessible at any given time. If the memory means is not a push-pop stack, then preferably there would also be an accessible stack pointer register. The stack pointer in that case indicates where in the memory means is the location designated as the accessible memory location in the algebraic operating system memory.

When the calculator embodying the present invention receives data via keyboard 2, the data is loaded, according to instruction commands, into display register 19, thus providing a visual display of data entering the electronic calculator. The data is stored in the display register 19 as data word. Upon receiving a first hierarchal mathematical command (as decoded by instruction word decoder logic 14), the data word then being stored in the display register 19 is loaded into the accessible memory location in algebraic operating system memory 17 along with the then parentheses level count and the pending arithmetic operator code indicative of the hierarchal mathematical command decoded. The entry of additional data following the entry of the hierarchal mathematical command causes the newly received additional data to be stored in the display register 19 as a new data word.

Upon receipt of the next hierarchal mathematical command (without an intervening parentheses) its hierarchy level (as denoted by Table 1) is compared with the hierarchy level of the previous hierarchal mathematical command which is stored as a pending arithmetic operator code in the accessible memory location in algebraic operating system memory 17. If the hierarchy level of the most recently received hierarchal mathematical command is of the same or lower hierarchy level than that of the pending arithmetic operator code, then that code and its associated data word are read out of the algebraic operating system memory 17, causing the indicated pending arithmetic operation to be executed by arithmetic unit 15 using the data word read out of the algebraic operating system memory 17 and the data word stored in the display register 19 as operators. The result of the arithmetic operation is stored in display register 19. The comparison is then repeated for the next pending arithmetic operator code unless algebraic operating system memory 17 has been emptied or unless the stored parentheses level count would decrement.

If the hierarchy level of the most recently received hierarchal mathematical command is of a higher hierarchy level than that of the pending arithmetic operator, then the most recently received hierarchal mathematical command, along with the current parentheses level count and the data word in the display register, are stored in the accessible memory location in the algebraic operating system memory 17. The most recently received hierarchal mathematical command is stored as a pending arithmetic operator code at that time.

If an intervening left hand parentheses is received between the hierarchal mathematical commands, then the most recently received hierarchal mathematical command and associated data word along with the incremented parentheses level count are stored in the accessible memory location in algebraic operating system memory 17 much like the receipt of a first hierarchal mathematical command.

Upon the receipt of a right handed parentheses, the pending arithmetic operator code and associated data word are read out of the accessible memory location in AOS memory 17, causing the arithmetic unit to perform the indicated arithmetic operation using the data word read out of memory 17 and the data word in the display register 19 as operators. The result is stored in the display register 19. The next pending arithmetic operator code and associated data word are similarly read out and executed, the process repeating until the stored parentheses level count decrements by one. At that time, the data word and pending arithmetic operator code associated with the stored decremented parentheses level count are not executed.

Upon the receipt of an equals sign, the algebraic operating system performs the same steps as is done upon the receipt of a right handed parenthesis, except that the pending arithmetic operators and associated data words in the algebraic operating system memory are read out in sequence without regard to the parentheses level count. By ignoring the parentheses level count, the equal sign effectively supplies any missing right handed parenthesis, this being an important feature of my invention reducing the number of keystrokes to solve certain algebraic expressions.

The aforementioned storage of pending arithmetic operators along with the associated data words or the execution of the indicated hierarchal mathematical command depending upon the relative hierarchy levels of the commands and codes involved continues as long as data is being entered into the calculator system. It should be evident that without the entry of any parentheses, three data words and associated pending arithmetic operator codes at most need be loaded into algebraic operating system memory 17, if the number of levels of hierarchy instructions is limited to that showed in Table I. That is, a data word and associated code would be stored upon the entry of a plus or minus, a second data word and its code which should be stored upon the entry of a divide or multiply and then a third data word and its code would be stored upon the entry of an exponentation command; there being no command having a higher hierarchy level in the hierarchy system of Table I, no more than three data words and associated codes would be stored in the algebraic operating system memory 17. However, when a left handed parenthesis is encountered, the algebraic operating system then permits the entry of a lower order hierarchal mathematical command following a higher order hierarchal mathematical command in the algebraic operating system memory 17 without the normal hierarchy level comparison being made. Thus, the aforementioned normal hierarchy rules are applied to the data entered within a pair of parentheses. It should be evident, therefore, that with the entry of parentheses, the number of data words (and associated pending operators and parentheses level counts) to be stored in the algebraic operating system memory is a function of how complicated an algebraic expression the calculator is to be able to accommodate. While the precise number of data words to be stored in the algebraic operating system memory is, of course, a design choice, I have found that utilizing an algebraic operating system memory capable of storing 7 to 10 data words permits the solution of moderately complex to very complex algebraic expressions.

The operation of the algebraic operating system described is more clearly understood with reference to Table II wherein the solution of the algebraic expression $3 \times 6 + 2 \times 3^{(2 \times (5+1))} \times 6 = 6,377,310$ using my algebraic operating system is demonstrated.

Referring now to Table II, there is shown the algebraic problem $3 \times 6 + 2 \times 3^{(2 \times (5+1))} \times 6 = 6,377,310$ being solved in an electronic calculator equipped with an Algebraic Operating System according to the present invention. In Table II there is shown in the columns reading from left to right (1) the function or data keyed in, (2) the contents of the display register and (3) the contents of the algebraic operating system memory. As aforementioned, the contents of the algebraic operating system memory preferably includes a data word, here shown as an 8 bit word, a pending arithmetic operator code and the parentheses level count. It being understood of course, that the length of the data word in the algebraic operating system memory or in the display register is a design choice and that the pending arithmetic operator code would typically be a three of four bit binary code, but is here shown as a conventional mathematical function symbol for sake of clarity. Further, the contents of the display register would typically have leading zeroes similar to the data word in the algebraic operating system memory, but is here shown without the leading zeroes because when the contents of the display register are displayed, the leading zeroes are preferably blanked. Since the algebraic operating system memory 17 functions as a stack memory, a plurality of data words may be shown stored therein. The lowest data word is in the accessible location, and the highest data word is in the memory located farthest from the accessible location.

Considering now the solution of the aforementioned algebraic expression, when the number three is keyed into the electronic calculator, a three is loaded into the display register. Upon subsequent entry of the hierarchal multiply command ($\times$ for multiply), the contents of the display register is loaded into the accessible data word location in the algebraic operating system memory along with the parentheses level count (here zero because no parentheses have been encountered) and the hierarchal mathematical command (here multiply) as the pending arithmetic operator. Upon entry of the additional data, e.g., the six, the data is loaded into the display register. Now upon the entry of the next hierarchal mathematical command (here add), the algebraic operating system compares the relative hierarchy level of the just received hierarchal mathematical command with the previously stored pending arithmetic operator. As aforementioned, if the just received hierarchal mathematical command is of the same or lower hierarchy level than that of the pending arithmetic operator code, the arithmetic operation indicated by the pending arithmetic operator code is executed before the just received hierarchal mathematical command and its associated data word are stored in the algebraic operating system memory 17. If, on the other hand, the just received hierarchal mathematical command is of a higher hierarchy level than that of the pending arithmetic operator code, the just received hierarchal mathematical command and its associated data word are similarly stored in the accessible location of algebraic operating system memory 17, the data previously located at the accessible location in algebraic operating system memory 17 being bumped in the AOS memory 17 stack. Since the hierarchal mathematical command now being inputted is an add command having a hierarchy level of 3 (see Table 1) while the pending multiply operator code, has a hierarchy level of 4, the algebraic operating system executes the pending arithmetic operator. Therefore, the number three stored in the data word in the algebraic operating system memory becomes the multiplicand and the number six stored in the display register 19 becomes the multiplier. The result, e.g., the number 18, is stored in display register 19. The result is also stored in the accessible data word location in algebraic operating system memory 17 along with the just received hierarchal mathematical command (add) since there are no additional pending arithmetic operators to be executed.

Next the number two is keyed into the calculator in the solution of the algebraic equation, the number two being stored in the display register. The following hierarchal multiply command has a higher hierarchy level than the pending arithmetic operator code (add), therefore the contents of the display register along with the just received hierarchal mathematical command are loaded into the accessible location in the algebraic operating system memory 17. The data previously at the accessible location is simultaneously bumped up one location if algebraic operating system memory is a stack memory. Of course, as is known in the art, instead of using a stack memory a more conventional memory may be used along with a pointer to keep track of the accessible memory location.

The next data to be keyed in is the number three which is duly loaded into the display register. Keying in the exponentation command ($Y^X$) causes the algebraic operating system to compare the hierarchy level of the just received hierarchal mathematical command ($Y^X$) with that of the pending arithmetic operator (multiply) and since the exponentation command has the higher hierarchy level (according to Table I), the hierarchal exponentation command along with the number three is loaded into the accessible location of the algebraic operating system memory, the previously received data again being bumped in that memory. The receipt of a left hand parenthesis by the calculator causes one to be added to the then current parentheses level count, thus the stack is bumped and a one is loaded into the parentheses level digit of the accessible location in the algebraic operating system memory 17.

Keying in of additional data (the number two) and an additional hierarchal mathematical command (multiply) causes that data and its code to be loaded under the accessible location of the algebraic operating system memory. The normal comparison between the hierarchy level of the just received hierarchal mathematical command (multiply) and the pending arithmetic operator (exponentation) is not carried out since they are not at the same parentheses level count. The keying in of another left handed parenthesis again causes the stack to be bumped and the parentheses level count to be incremented by one. Keying in of the number 5 and the addition command again causes the data and the most recently received hierarchal mathematical command to be loaded into the algebraic operating system memory without the comparison being made, the parentheses level count having been incremented to 2. The entry of the number one loads a one into display register 19.

The keying in of the first right handed parenthesis, which has the hierarchy level 2 (see Table I) causes all previously keyed in hierarchal mathematical commands at the two parentheses count level to be executed in sequence. That is, all stored pending arithmetic operators at the two parentheses count level are read out in the opposite order in which they are read in (the algebraic operating system memory functioning as a memory stack). Thus, the data word (the number 5) and the pending arithmetic operator (add) are executed using the contents of the display register (the number one) as an operator, the result (the number 6) being stored in the display register. Since the data word and pending operator code at the accessible location in the algebraic operating system memory has been read out, the stack then "pops"—that is, the data word and associated code and parentheses level count previously stored in the location adjacent to the accessible location moves into the accessible location, the other data words and associated codes and parentheses level counts similarly moving closer to the accessible location.

Upon receipt of second right handed parenthesis, all pending operators at the one parentheses level count are executed, the number two in the data word position becoming the multiplier according to the multiply code and the six in the display register becoming the multiplicand. The execution of the multiply command then stores the number twelve in the display register, the algebraic operating system memory stack again popping as shown in Table II.

Upon keying in the last multiply command in the exemplary algebraic expression, the hierarchy level the multiply command is compared with the pending arithmetic operator and, as aforementioned, the pending arithmetic operator is executed if it has the same or higher hierarchy level. Since exponentiation has a higher hierarchy level than multiply, the exponentiation command is executed, i.e., the number in the data word (three) is taken to the power indicated by the number in the display register (twelve).

Similarly, since the next pending arithmetic operator (here multiply) has the same hierarchy level as the just received hierarchal mathematical command, the pending arithmetic operation is also executed, the two becoming the multiplier and the results of $3^{12}$ becoming the multiplicand, thereby storing the result (1,062,882) in the display register. The next pending arithmetic operator (add) is not executed, it having a lower hierarchy level than the just received multiply command. Thus, the contents of the display register along with the just received hierarchal command (multiply) are loaded into the accessible location AOS memory, the memory being bumped accordingly.

The keying in of additional data (the number 6) loads the data into the display register. Finally, the keying in of the equals sign, which has a hierarchy level of one, causes all pending arithmetic operations to be preformed regardless of parentheses level count. Thus, the equals sign effectively supplies any missing right handed parenthesis (none is missing in the exemplary problem). Thus, in the exemplary problem, the number in the display register becomes the multiplier while the number 1,062,882 in the accessible data word location becomes the multiplicand for the execution of the pending arithmetic operation (multiply). The execution of the pending arithmetic operates code "pops" the stack and the result of the multiplication is added to the number 18 stored in the next pending arithmetic operation according to the add code stored therewith. The results of these operations (6,377,310) is stored in the display register for display purposes, the stack now being empty.

It should be evident from the foregoing discussion that additional levels of hierarchy may be used, if other algebraic expressions are used. For example, the expression D%, which calculates percent change in two numbers, can be given a higher hierarchy level than exponentation, if desired. Thus, 64 D% 32=$8^2$D% 32=−50. Additionally, it should be evident that the AOS memory may comprise separate memories for the data words, pending arithmetic operations and parentheses level count rather than a single memory for all three elements.

Referring now to Table III, there is a list of read-only-memory (ROM) microcode instruction words which may be used to implement the algebraic operating system of this invention in an electronic calculator of the type disclosed in U.S. Pat. No. 3,922,538 issued to Cochran et al on Nov. 25, 1975 and assigned to the assignee of this invention. In Table III, considering the columns from left to right, the left most column is the address (in hexadecimal) of the instruction word located in the ROM, the next column list the 13 bit instruction word (in binary) located at the address indicated, the third column indicates the line number of the entry in Table III (for information only), and the remaining columns are various mnemonic and narrative terms relating to the instruction words located in the second column. The list of instruction words in Table III when implemented in an electronic calculator of the type disclosed in U.S. Pat. No. 3,922,538 issued Nov. 25, 1975, to Cochran et al and assigned to the assignee of this invention provides data electronic calculator with an algebraic operating system according to the present invention. U.S. Pat. No. 3,922,538, which is hereby incorporated herein by reference, describes the format of the instruction words in Table III.

Having described the invention in connection with the specific embodiment thereof, it is to be understood that further modification may suggest itself those skilled in the art. The scope of the present invention is not to be limited to the embodiment disclosed except as set forth in the appended claims.

TABLE I

| Hierarchy Level | Hierarchal Mathematical Command And Pending Arithmetic Operators |
|---|---|
| 5 | EXPONENTATION ... $Y^x$ ... OR ... $\sqrt[x]{Y}$ |
| 4 | MULTIPLY ... × ... OR DIVIDE ... ÷ ... |
| 3 | ADD ... + ... OR SUBTRACT ... − ... |
| 2 | RIGHT HANDED PARENTHESIS ... ) ... |
| 1 | EQUALS SIGN ... = ... |

TABLE II

| FUNCTION OR DATA KEYED IN | DISPLAY REGISTER | A.O.S. MEMORY | | |
|---|---|---|---|---|
| | | DATA WORD | PEND. OPCODE | PAREN. LEVEL CT. |
| 3 | 3 | — | | |
| × | 3 | 00000003 | × | 0 |
| 6 | 6 | 00000003 | × | 0 |
| + | 18 | 00000003 | + | 0 |
| 2 | 2 | 00000018 | + | 0 |
| × | 2 | 00000018 | + | 0 |
| | | 00000002 | × | 0 |
| 3 | 3 | 00000018 | + | 0 |
| | | 00000002 | × | 0 |
| $y^x$ | 3 | 00000018 | + | 0 |
| | | 00000002 | × | 0 |
| | | 00000003 | $y^x$ | 0 |
| ( | 3 | 00000018 | + | 0 |
| | | 00000002 | × | 0 |
| | | 00000003 | $y^x$ | 0 |
| | | | | 1 |
| 2 | 2 | 00000018 | + | 0 |
| | | 00000002 | × | 0 |
| | | 00000003 | $y^x$ | 0 |
| | | | | 1 |
| × | 2 | 00000018 | + | 0 |
| | | 00000002 | × | 0 |
| | | 00000003 | $y^x$ | 0 |
| | | 00000002 | × | 1 |
| ( | 2 | 00000018 | + | 0 |
| | | 00000002 | × | 0 |
| | | 00000003 | $y^x$ | 0 |
| | | 00000002 | × | 1 |
| | | | | 2 |
| 5 | 5 | 00000018 | + | 0 |
| | | 00000002 | × | 0 |
| | | 00000003 | $y^x$ | 0 |
| | | 00000002 | × | 1 |
| | | | | 2 |
| + | 5 | 00000018 | + | 0 |
| | | 00000002 | × | 0 |
| | | 00000003 | $y^x$ | 0 |
| | | 00000002 | × | 1 |
| | | 00000005 | + | 2 |
| 1 | 1 | 00000018 | + | 0 |
| | | 00000002 | × | 0 |
| | | 00000003 | $y^x$ | 0 |
| | | 00000002 | × | 1 |
| | | 00000005 | + | 2 |
| ) | 6 | 00000018 | + | 0 |
| | | 00000002 | × | 0 |
| | | 00000003 | $y^x$ | 0 |
| | | 00000002 | × | 1 |
| ) | 12 | 00000018 | + | 0 |
| | | 00000002 | × | 0 |
| | | 00000003 | $y^x$ | 0 |
| × | 1062882 | 00000018 | + | 0 |
| | | 01062882 | × | 0 |
| 6 | | 00000018 | + | 0 |
| | | 01062882 | × | 0 |
| = | 6377310 | — | | |

TABLE III

| Address | Instruction Word | Line Number | Informational Mnemonics | | |
|---|---|---|---|---|---|
| 011F | 0 1010 0000 0 111 | 0631 | *-------NESTING ROUTINE FOR MATH HIERARCHY A,B,C,D REG=DEST | | |
| 0120 | 1 1 000000010 0 | 0632 | EQUL | NUMBER 0 | |
| 0121 | 0 1010 0001 0 111 | 0633 | | BO NES | ALWAYS BRANCH |
| 0122 | 0 0010 1111 0 110 | 0634 | RPAR | NUMBER 1 | |
| 0123 | 0 1010 0011 0 111 | 0635 | NES | R5D DPT | |
| 0124 | 0 1010 1101 0 110 | 0636 | | RCLG | |
| 0125 | 0 1100 0110 0 000 | 0637 | | LOADD MAEX | |
| 0126 | 1 0 000001101 0 | 0638 | | TF AMUL | |
| 0127 | 0 0110 0011 1 001 | 0639 | | BZ NEST2 | |
| 0128 | 1 1 000010111 0 | 0640 | | CDK EXP | ILLEGAL OPR-EQUAL SEQUENCE |
| 0129 | 0 0000 1001 1 001 | 0641 | | BO NEST2 | |
| 012A | 0 1001 0111 1 110 | 0642 | | SF BASSUME | |
| 012B | 0 0001 1101 0 101 | 0643 | | SRLD MANT | |
| 012C | 0 0111 0010 1 100 | 0644 | | EXCD ALL | |
| 012D | 0 0001 1101 0 101 | 0645 | | SCKC EXP1 | |
| 012E | 1 0000010001 0 | 0646 | | EXCD ALL | |
| 012F | 0 1010 0100 0 111 | 0647 | NEAS | BO NEST2 | ALWAYS BRANCH |
| 0130 | 1 1 000000100 0 | 0648 | | NUMBER 4 | |
| 0131 | 0 1010 1000 0 111 | 0649 | NFMD | BO NEST | ALWAYS BRANCH |
| 0132 | 1 1 000000010 0 | 0650 | | NUMBER 8 | |
| 0133 | 0 1010 1100 0 111 | 0651 | NEER | BO NEST | ALWAYS BRANCH |
| 0134 | 0 0010 1111 0 110 | 0652 | NEST | NUMBER 12 | |
| 0135 | 1 0 000110 0 000 | 0653 | | R5D DPT | |
| 0136 | 1 0 000000011 0 | 0654 | | TF AMUL | |
| 0137 | 0 0000 0110 1 010 | 0655 | | BZ NESTA | TEST ILLEGAL MULTIPLE-OPR PUSHES |
| 0138 | 1 1 0001100000 0 | 0656 | | ZF BMUL | |
| 0139 | 0 1010 0011 1 111 | 0657 | | BO NEST6 | |
| 013A | 0 1100 1101 0 110 | 0658 | NESTA | RCLG | |
| 013B | 1 1 000000100 0 | 0659 | | LOADD MAEX | |
| 013C | 0 1010 0011 1 111 | 0660 | NEST1 | BO NEST2 | ALWAYS BRANCH |
| 013D | 0 0001 1101 0 110 | 0661 | | RCLG | |
| 013E | 0 0000 0001 0 100 | 0662 | | LOADD ALL | |
| 013F | 0 0000 0011 0 100 | 0663 | | XF ASUDI | |
| 013F | 0 0001 0011 0 100 | 0664 | NEST2 | ADKC ALL | TEST IF STACK=0 |

TABLE III
Page 2

| Address | Instruction Word | Line Number | Informational Mnemonics | | |
|---|---|---|---|---|---|
| 0140 | 0 0111 0010 1 001 | 0665 | | CCK | EXP1 |
| 0141 | 1 0 000010011 0 0 | 0666 | | BZ | NEST4 |
| 0142 | 0 1100 0110 1 100 | 0667 | | SRLC | MANT | TEST IF LAST LEVEL< CUR LEVEL |
| 0143 | 0 1100 0111 1 110 | 0668 | | SRLD | MAEX |
| 0144 | 0 0001 1010 1 001 | 0669 | | CCD | ALL |
| 0145 | 0 0110 0111 0 110 | 0670 | | SLLD | EXP |
| 0146 | 0 0001 1101 0 110 | 0671 | | CCD | ALL |
| 0147 | 0 0010 1101 0 101 | 0672 | | EXCD | DPT |
| 0148 | 1 0 000001111 0 0 | 0673 | | BZ | NEST4 | GET PREVIOUS NUM AND OPR |
| 0149 | 0 0001 0011 0 100 | 0674 | 0167 | ADKC | ALL |
| 014A | 0 0111 0010 1 001 | 0675 | | SCKC | EXP1 |
| 014B | 0 1100 0110 1 100 | 0676 | | SLLC | MAEX |
| 014C | 0 1001 1101 1 100 | 0677 | | CLC | MANT |
| 014D | 0 1010 1101 1 000 | 0678 | | CLC | DPT |
| 014E | 0 1010 0010 0 001 | 0679 | | MEMO | |
| 014F | 0 0001 0010 0 011 | 0680 | | CIO | ALL |
| 0150 | 0 0001 1101 0 100 | 0681 | | LOADB | ALL |
| 0151 | 0 0010 0001 0 100 | 0682 | | ABKC | DPT | TEST IF LAST OPR < CUR OPR |
| 0152 | 0 0010 1010 1 001 | 0683 | | CCD | DPT |
| 0153 | 1 0 000001100 0 0 | 0684 | 016B | BZ | NEST5 |
| 0154 | 0 1100 0110 1 100 | 0685 | | SRLC | MAEX | SAVE CURRENT OPERATOR(4,8,12) |
| 0155 | 0 0110 0010 0 110 | 0686 | | ACKD | EXP |
| 0156 | 0 1001 0111 1 110 | 0687 | | SRLD | MANT |
| 0157 | 0 1010 0010 1 111 | 0688 | | STOG | |
| 0158 | 0 0001 0010 0 001 | 0689 | | DIO | ALL |
| 0159 | 0 1010 0011 1 100 | 0690 | NEST3 | EXTKR | | DELETE PAREN-LEVEL CT FOR RECALLED NUM |
| 015A | 0 1010 0000 1 101 | 0691 | | XKRSR | |
| 015B | 0 1010 0000 1 100 | 0692 | | FXTKR | |
| 015C | 0 0000 1011 0 101 | 0693 | | SKRD8 | |
| 015D | 0 1001 1010 0 101 | 0694 | | SKRD7 | |
| 015E | 0 0010 0001 0 011 | 0695 | | ABKB | DPT |
| 015F | 0 1010 0101 1 000 | 0696 | | R5KR | |
| 0160 | 0 0001 0001 1 011 | 0697 | | SRLB | ALL | SET KF FOR SUBROUTINE JUMP |
| 0161 | 0 0010 0001 0 011 | 0698 | | ABKB | DPT |
| 0162 | 0 0000 0000 1 111 | 0699 | | R5FLB | |
| 0163 | 0 0100 1101 0 011 | 0700 | | CONSTB DPT12 |
| 0164 | 0 1001 0010 0 011 | 0701 | | SLLB | MANT |
| 0165 | 0 0000 001 0 100 | 0702 | | XF | ASUDI |
| 0166 | 1 1 001101101 0 0 | 0703 | 0243 | BO | NEST3A | UNPACK PREVIOUS NUM(B-REG) |
| 0167 | 0 1010 0010 0 111 | 0704 | NEST4 | NUMBER 2 |
| 0168 | 0 0010 1111 0 100 | 0705 | | R5C | DPT |
| 0169 | 0 0010 1010 1 001 | 0706 | | CCD | DPT | ALWAYS (4/13/76 TO FIX 1/3 -1/3=) |
| 016A | 1 1 000010000 0 0 | 0707 | 018A | BO | NEST7 | TEST IF PAREN OR EQUAL |

TABLE III
Page 3

| Address | Instruction Word | Line Number | | Informational Mnemonics | |
|---|---|---|---|---|---|
| 016B | 0 0001 0011 0 100 | 0708 | NEST5 | ADKC ALL | INCREASE STACK |
| 016C | 0 0111 0010 0 110 | 0709 | | ACKD ESP 1 | |
| 016D | 0 0001 0110 1 100 | 0710 | | SRLC ALL | |
| 016E | 0 1001 1101 1 100 | 0711 | | CLC MANT | |
| 016F | 0 0001 0110 0 100 | 0712 | | SLLC ALL | |
| | | 0713 | | TF BMUL | TEST IF IMPLIED MULTIPLICATION |
| 0170 | 0 0001 0000 0 000 | 0714 | * | BZ NEST11 | |
| 0171 | 0 0001 0000 0 000 | 0715 | * | ACKC LLSD1 | |
| 0172 | 0 0001 0000 0 000 | 0716 | * | BZ LPAR3 | |
| 0173 | 0 0001 0000 0 000 | 0717 | | AAKA ALL | ************************DUMMY |
| 0174 | 0 0001 0110 0 100 | 0718 | | AAKA ALL | ************************DUMMY |
| 0175 | 0 0101 0010 1 001 | 0719 | | AAKA ALL | ************************DUMMY |
| 0176 | 1 1 0000100010 0 | 0720 | | AAKA ALL | ************************DUMMY |
| 0177 | 0 1001 0110 1 100 | 0721 | NEST11 | SLLC ALL | STORE THE NEW NUMBER |
| 0178 | 0 1001 0111 0 110 | 0722 | | CCK LLSD1 | |
| 0179 | 0 1001 1010 0 110 | 0723 | 0198 | BO NEST6 | TOO MANY NUMBERS FOR HIERARCHY |
| 017A | 0 1010 0010 0 111 | 0724 | | SRLC MANT | STORE NEW LEVEL COUNTER |
| 017B | 0 0001 0011 0 001 | 0725 | | SLLD MANT | |
| 017C | 0 0000 0110 1 010 | 0726 | | ACDD MANT | |
| 017D | 0 0001 0000 0 110 | 0727 | | STOG MANT | |
| 017E | 0 1010 1111 0 110 | 0728 | | DIO ALL | |
| 017F | 0 0010 1111 0 110 | 0729 | | ZF BMUL | |
| 0180 | 0 1001 0101 0 011 | 0730 | | AAKB ALL | PACK NEW NUM FOR STORE |
| 0181 | 0 0001 0101 0 011 | 0731 | | FLAR5 DPT | |
| 0182 | 0 0010 0011 0 011 | 0732 | | R5B DPT | |
| 0183 | 0 1001 1101 1 100 | 0733 | | SRLB MANT | |
| 0184 | 0 1010 1111 1 000 | 0734 | | SLLB ALL | |
| 0185 | 0 0001 0010 0 001 | 0735 | | ADKB DPT | |
| 0186 | 0 0001 0001 0 001 | 0736 | | CLC MANT | |
| 0187 | 0 0000 0000 0 001 | 0737 | | CONSTC DPT1 | |
| 0188 | 1 1 0000010000 0 | 0738 | | MEMO | |
| 0189 | 0 0001 0011 0 100 | 0739 | | CIO ALL | |
| 018A | 0 0101 0010 1 100 | 0740 | | BIO ALL | |
| 018B | 1 0 0000000100 0 | 0741 | NEST9L | SF ALBL | |
| 018C | 0 1001 0010 0 110 | 0742 | | BO NEST9 | ALWAYS BRANCH |
| 018D | | 0743 | NEST7 | ADKC ALL | DECREASE PAREN COUNTER |
| | | 0744 | | SCKC LLSD1 | |
| | | 0745 | 0199 | BZ NEST8 | |
| | | 0746 | 0190 | ACKD MANT | TOO MANY RIGHT PAREN |

TABLE III
Page 4

| Address | Instruction Word | Line Number | | Informational Mnemonics | | |
|---|---|---|---|---|---|---|
| 018E | 0 1010 0010 1 111 | 0747 | | NEST10 | STOG | ALL |
| 018F | 0 0001 0011 0 001 | 0748 | | | DIO | ALL |
| 0190 | 0 0010 0011 1 001 | 0749 | | | CDK | DPT | IF EQUAL OPR CONTINUE TO DECEND LEVELS |
| 0191 | 1 0 000001001 1 | 0750 | 0188 | | BZ | NEST9L | IF PAREN OPR (EXIT) |
| 0192 | 0 0110 0011 1 001 | 0751 | | NEST8 | CDK | EXP | TEST IF STACK EMPTY |
| 0193 | 1 0 000101010 1 | 0752 | 013F | | BZ | NEST2 |
| 0194 | 0 0001 1101 1 110 | 0753 | | | CLD | ALL |
| 0195 | 0 1010 0010 1 111 | 0754 | | | STOG | ALL |
| 0196 | 0 0001 0011 0 001 | 0755 | | | DIO | ALL |
| 0197 | 1 1 000000010 0 | 0756 | 0199 | | BO | NEST9 | ALWAYS BRANCH |
| 0198 | 0 0000 1001 1 001 | 0757 | | NEST6 | SF | BASSUME |
| 0199 | 0 0000 0101 1 001 | 0758 | | NEST9 | SF | AEND |
| 019A | 0 0000 0101 1 010 | 0759 | | | ZF | BERASE |
| 019B | 0 0000 1100 1 000 | 0760 | | 1PREINC | TF | BREGPUSH |
| 019C | 1 0 000101110 0 | 0761 | 01CA | | BZ | PRE |
| 019D | 0 1010 0000 1 101 | 0762 | | | XKRSR |
| 019E | 0 1010 0000 0 100 | 0763 | | | INCKR |
| 019F | 0 1010 0000 1 101 | 0764 | | | XKRSR |
| 01A0 | 0 0000 0100 0 000 | 0765 | | | TF | AZELF |
| 01A1 | 1 1 000100011 0 | 0766 | 01C4 | | BO | PR10 |
| 01A2 | 0 0000 0100 0 010 | 0767 | | | ZF | AZELF |
| 01A3 | 1 1 000100110 0 | 0768 | 01E9 | | BO | 1ERR3 | ALWAYS BRANCH |
| 01A4 | 0 0000 1011 0 001 | 0769 | | TAN | SF | ATAN |
| 01A5 | 1 1 011101010 0 | 0770 | 0377 | | BO | SINE | ALWAYS |
| 01A6 | 0 1100 1101 0 010 | 0771 | | PRODS | EXAB | MAEX |
| 01A7 | 0 0010 0001 0 011 | 0772 | | | ABKB | DPT |
| 01A8 | 0 0000 0000 0 111 | 0773 | | | R5FLA |
| 01A9 | 0 0000 1000 1 000 | 0774 | | | TF | BINV |
| 01AA | 1 1 000000010 0 | 0775 | 01AC | | BO | M/DS | MUST BE AFTER PRODS |
| 01AB | 0 0000 0001 1 001 | 0776 | | M/DS | SF | ASUDI | *POUT TO LOC. D11* |
| 01AC | 0 1010 0001 1 100 | 0777 | | | ESTKR | NUMBER 1 |
| 01AD | 0 1010 0001 0 111 | 0778 | | | |
| 01AE | 0 0000 1000 0 101 | 0779 | | SETD10 | SKRD5 |
| 01AF | 0 0000 1100 0 101 | 0780 | | SETD00 | SKRD9 |
| 01B0 | 0 0000 1111 0 101 | 0781 | | SETC00 | SKRD12 |
| 01B1 | 0 0000 1110 0 101 | 0782 | | | SKRD11 |
| 01B2 | 0 1010 0001 1 000 | 0783 | | R5POUT | R5KR |
| 01B3 | 0 0000 0001 0 101 | 0784 | | | SKRPOUT |
| 01B4 | 0 0001 0000 0 000 | 0785 | | AUSE | AAKA | ALL | DUMMY |

What is claimed:

1. An electronic calculator comprising:
   (a) a data entry unit for inputting algebraic expressions including numeric data, hierarchy mathematical commands and parentheses;
   (b) an arithmetic unit for performing arithmetic operations on numeric data in response to hierarchy mathematical commands;
   (c) a memory for storing a plurality of multi-bit data words, pending arithmetic operators and parenthesis level count, said parenthesis level count being indicative of the number of left-hand parentheses encountered less the number right-hand parentheses encountered in an algebraic expression being inputted at said data entry unit; and
   (d) logic means for enabling said arithmetic unit to perform arithmetic operations on numeric data inputted at said data entry unit within a pair of parentheses according to the hierarchy mathematical commands inputted at said data entry unit with said numeric data, said logic means enabling said arithmetic unit to perform higher order hierarchy mathematical commands before lower order hierarchy mathematical commands inputted at said data entry unit within a pair of parentheses, and wherein said logic means selectively loads hierarchy mathematical commands and associated numeric data into said memory as pending arithmetic operators and multi-digit data words, respectively.

2. An electronic calculator according to claim 1, wherein said data entry unit is a keyboard having provisions for inputting numeric data, hierarchal mathematical commands and left and right hand parentheses.

3. The electronic calculator according to claim 2, futher including:
   (a) display means, and
   (b) a display register for storing numeric data to be displayed by said display means and inputted at said keyboard.

4. The electronic calculator according to claim 3, wherein said memory is a stack memory.

5. The electronic calculator according to claim 4, wherein said logic means stores the most recently received hierarchal mathematical command received at said keyboard and the contents of said display register in said memory stack upon the occurrence of either:
   (i) the comparison of the just received hierarchal mathematical command with the previously received hierarchal mathematical command indicates that the just received hierarchal mathematical command has a higher hierarchy level than the previously received hierarchal mathematical command, or
   (ii) the just received hierarchal mathematical command is at a higher parentheses level count than the previously received hierarchal mathematical command, or
   (iii) the just received hierarchal mathematical command is of the same or lower hierarchy level than the previously received hierarchal mathematical command, the previously received hierarchal mathematical command being at the same parentheses level count as the just received hierarchal mathematical command and the previously received hierarchal mathematical command being executed by said arithmetic unit before said just received hierarchal mathematical command is stored in said memory.

6. An electronic calculator comprising:
   (a) a data entry unit for inputting algebraic expressions having numeric data, hierarchal mathematical commands and parentheses;
   (b) an arithmetic unit for performing arithmetic operations on numeric data in response to hierarchal mathematical commands;
   (c) memory means for storing numeric data, hierarchal mathematical commands and the difference in the number of right and left-hand parentheses of an algebraic expression being inputted at said data entry unit;
   (d) logic means for enabling said arithmetic unit to perform arithmetic operations on numeric data inputted at said data entry unit within a pair of parentheses according to the hierarchal mathematical commands inputted at said data entry unit with said numeric data, said logic means enabling said arithmetic unit to perform a higher order hierarchal mathematical command before a lower order hierarchal mathematical command; and
   (e) means for loading said memory means with the most recently received numeric data and hierarchal mathematical command received at said entry unit along with the difference in the number of left and right-hand parentheses previously inputted.

7. The electronic calculator according to claim 6, wherein said logic means further includes means for reading out previously stored numeric data and associated hierarchal mathematical commands when the most recently received hierarchal mathematical command is of the same or lower hierarchy level than the previously received hierarchal mathematical command unless the difference in the number of said right and left handed parentheses received by said data entry means has increased between the receipt of said previous hierarchal mathematical command and said just received hierarchal mathematical command.

8. A method of operating an electronic calculator having keyboard for entering numeric data, hierarchal mathematical commands and right and left handed parentheses, said method comprising the steps of:
   (a) storing received numeric data and associated hierarchal mathematical commands and the difference in the number of entered right and left handed parentheses in an algebraic operating system memory;
   (b) comparing the hierarchy level of a just received hierarchal mathematical command with the hierarchy level of the previously received hierarchal mathematical command if the difference in the number of left and right handed parentheses entered at the keyboard is the same when said previous hierarchal mathematical command and said present hierarchal mathematical command are received; and
   (c) reading out said previous hierarchal mathematical command and associated numeric data from said algebraic operating system memory and performing the hierarchal mathematical command indicated when the hierarchy level of the previously received hierarchal mathematical command is of a higher or the same hierarchy level as said just received hierarchal mathematical command.

9. The method according to claim 8, further including the step of reading out all of the previous hierarchal mathematical commands and associated numeric data having the same parentheses level count from said algebraic operating system memory upon the entering of a right handed parentheses at said keyboard.

10. The method according to claim 9, further including the step of reading out all of the previous hierarchal mathematical commands and associated numeric data from said algebraic operating system memory upon the entering of an equals sign at said keyboard.

* * * * *